(12) United States Patent
Amarilio et al.

(10) Patent No.: US 10,482,056 B2
(45) Date of Patent: Nov. 19, 2019

(54) TRANSFER OF MASTER DUTIES TO A SLAVE ON A COMMUNICATION BUS

(71) Applicant: QUALCOMM Incorporated, San Diego, CA (US)

(72) Inventors: Lior Amarilio, Yokneam (IL); Yuval Corey Hershko, Haifa (IL); Nir Strauss, Yokneam Moshava (IL)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/819,641

(22) Filed: Nov. 21, 2017

(65) Prior Publication Data
US 2019/0155781 A1 May 23, 2019

(51) Int. Cl.
*G06F 13/42* (2006.01)
*G06F 1/3287* (2019.01)
*G06F 15/78* (2006.01)
*G06F 13/364* (2006.01)

(52) U.S. Cl.
CPC ........ *G06F 13/4291* (2013.01); *G06F 13/364* (2013.01); *G06F 15/7807* (2013.01); *G06F 1/3287* (2013.01)

(58) Field of Classification Search
CPC ........................... G06F 13/4291; G06F 1/3287
See application file for complete search history.

(56) References Cited

U.S. PATENT DOCUMENTS

| | | |
|---|---|---|
| 8,990,464 B2 | 3/2015 | Kessler |
| 9,727,519 B2 | 8/2017 | Randell |
| 2010/0185896 A1* | 7/2010 | Andres ............... G06F 11/2005 714/5.11 |
| 2014/0013019 A1 | 1/2014 | Seki et al. |
| 2016/0124892 A1 | 5/2016 | Amarilio et al. |
| 2016/0217090 A1 | 7/2016 | Sengoku et al. |
| 2017/0078213 A1* | 3/2017 | May ................... H04L 47/6225 |
| 2017/0199839 A1 | 7/2017 | Mishra et al. |
| 2017/0289679 A1 | 10/2017 | Amarilio et al. |

FOREIGN PATENT DOCUMENTS

EP       2391095 A1       11/2011

OTHER PUBLICATIONS

International Search Report and Written Opinion for PCT/US2018/062075, dated Mar. 13, 2019, 14 pages.

* cited by examiner

*Primary Examiner* — Zachary K Huson
(74) *Attorney, Agent, or Firm* — Withrow & Terranova, PLLC

(57) ABSTRACT

Systems and methods to transfer master duties to a slave on a communication bus are disclosed. A master of a communication bus determines that one or more slaves are capable of serving as a sub-master, including providing a clock signal and owning control information bits. Once that determination is made, the master may determine that processing within the master is not required for a particular activity on the bus. The master then alerts one such capable slave to prepare to assume sub-master duties. Once the slave confirms that the slave is ready to assume the sub-master duties, the master may transmit a handover frame on the bus, and the slave begins acting as a sub-master. The master may then enter a low-power state, which may promote power savings, reduce heat generation, and provide other advantages.

26 Claims, 5 Drawing Sheets

TRANSFER OF MASTER DUTIES TO A SLAVE ON A COMMUNICATION BUS

BACKGROUND

I. Field of the Disclosure

The technology of the disclosure relates generally to communication buses and, particularly, to controlling master duties on the communication buses.

II. Background

Computing devices have become increasingly common throughout society. Computing devices have evolved from cumbersome, immobile, multi-room devices that slowly operated on a few instructions to small portable devices that can perform myriad functions effectively simultaneously. The ability to perform such varied functions has led to a general convergence of multiple different types of devices, including telephonic devices, cameras, and audiovisual devices, creating a multifunction multimedia device that may include multiple speakers and multiple microphones.

Various protocols have been promulgated to support the use of multiple speakers and microphones. In particular, the MIPI Alliance has published the Serial Low-power Interchip Media Bus (SLIMbus) standard. The SLIMbus standard has not seen widespread adoption, and the MIPI Alliance has more recently published the SOUNDWIRE standard as an alternative thereto.

SOUNDWIRE has many advantages, but the manner in which the communication bus is managed requires that the bus master remain active for all communication thereon so as to provide a bus clock and to handle any control information that is generated during the communication. Keeping the bus master active consumes power. While such power consumption may not be of great concern in a desktop computing device, such power consumption may be unnecessary in battery-operated devices. Accordingly, battery life for mobile devices may be extended by finding ways that allow the bus master to enter a low-power or sleep state while keeping the bus active.

SUMMARY OF THE DISCLOSURE

Aspects disclosed in the detailed description include systems and methods to transfer master duties to a slave on a communication bus. Exemplary aspects of the present disclosure allow a master of a communication bus to determine that one or more slaves are capable of serving as a sub-master, including providing a clock signal and owning control information bits. Once that determination is made, the master may determine that processing within the master is not required for a particular activity on the bus, such as when the payload transported on the communication bus moves between two or more slaves while not addressing the master. The master then alerts one such capable slave to prepare to assume the sub-master duties. Once the slave confirms that the slave is ready to assume the sub-master duties, the master may transmit a handover frame on the bus, and the slave begins acting as a sub-master. The master may then enter a low-power state, which may promote power savings, reduce heat generation, and provide other advantages. While exemplary aspects are well suited for a SOUNDWIRE communication bus, the present disclosure may be applied to any bus that does not normally allow transfer of master duties.

In this regard in one aspect, a master integrated circuit (IC) is disclosed. The master IC includes a bus interface configured to be coupled to a SOUNDWIRE bus. The master IC also includes a transceiver coupled to the bus interface. The master IC also includes a control system operatively coupled to the transceiver. The control system is configured to instruct a slave device amongst a plurality of slave devices coupled to the SOUNDWIRE bus to prepare to assume sub-master control of the SOUNDWIRE bus. The control system is also configured to pass master duties to the slave device.

In another aspect, a slave IC is disclosed. The slave IC includes a bus interface configured to be coupled to a SOUNDWIRE bus. The slave IC also includes a transceiver coupled to the bus interface. The slave IC also includes a control system operatively coupled to the transceiver. The control system is configured to receive an instruction from a master IC through the SOUNDWIRE bus to prepare to assume sub-master control of the SOUNDWIRE bus. The control system is also configured to assume the sub-master control of the SOUNDWIRE bus.

In another aspect, a method is disclosed. The method includes commencing operation with a plurality of devices coupled to a communication bus. A first device of the plurality of devices operates as a master device, and other devices of the plurality of devices operate as slave devices. The method also includes instructing, through the communication bus, one of the slave devices to prepare to assume sub-master control of the communication bus. The method also includes passing master duties from the master device to the one of the slave devices.

In another aspect, a SOUNDWIRE system is disclosed. The SOUNDWIRE system includes a SOUNDWIRE bus. The SOUNDWIRE system also includes a master IC. The master IC includes a master bus interface configured to be coupled to the SOUNDWIRE bus. The master IC also includes a master transceiver coupled to the master bus interface. The master IC also includes a master control system operatively coupled to the master transceiver. The SOUNDWIRE system also includes a slave IC. The slave IC includes a slave bus interface configured to be coupled to the SOUNDWIRE bus. The slave IC also includes a slave transceiver coupled to the slave bus interface. The slave IC also includes a slave control system operatively coupled to the slave transceiver. The master control system is configured to instruct the slave control system to prepare to assume sub-master control of the SOUNDWIRE bus. The master control system is also configured to pass master duties to the slave IC.

DETAILED DESCRIPTION

Figure 1:
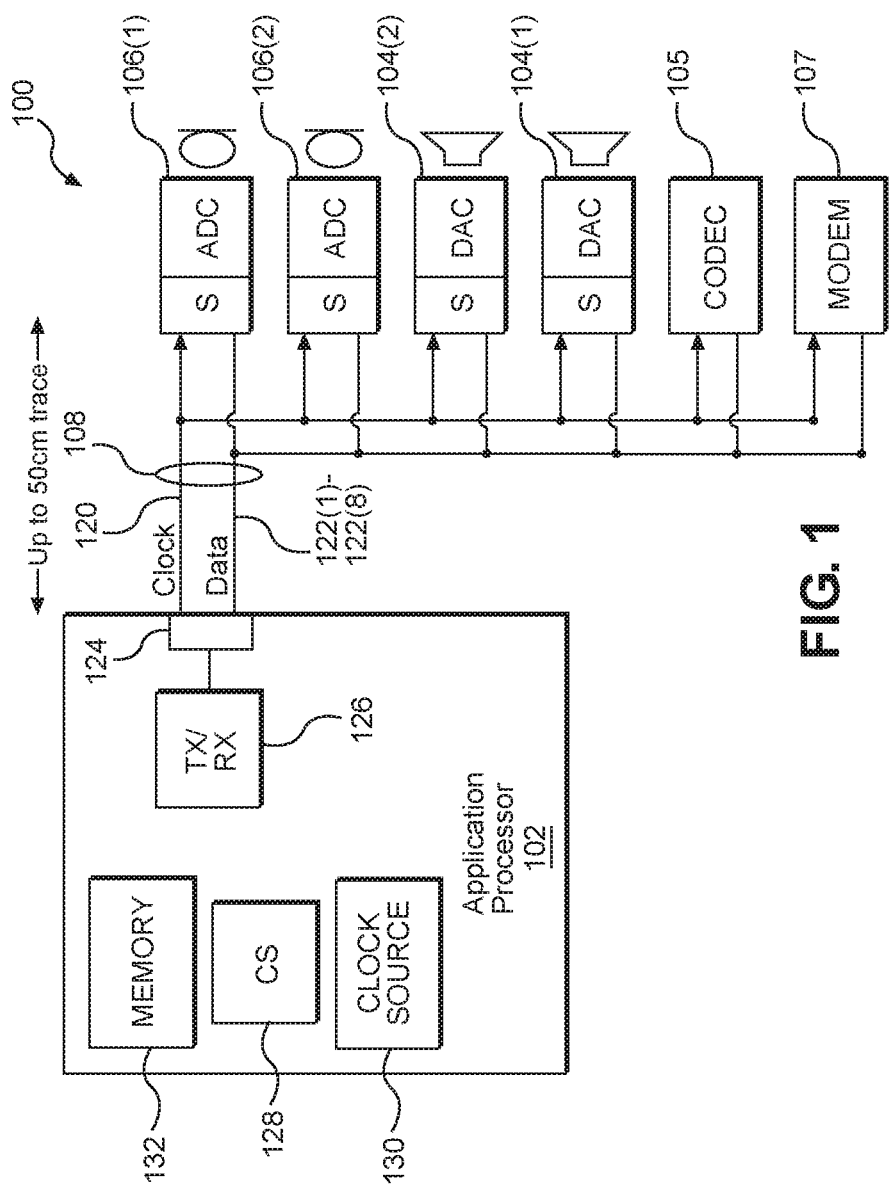
FIG. 1 is a block diagram of an exemplary SOUNDWIRE communication bus having a master and multiple slaves.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods to transfer master duties to a slave on a communication bus. Exemplary aspects of the present disclosure allow a master of a communication bus to determine that one or more slaves are capable of serving as a sub-master, including providing a clock signal and owning control information bits. Once that determination is made, the master may determine that processing within the master is not required for a particular activity on the bus, such as when the payload transported on the communication bus moves between two or more slaves while not addressing the master. The master then alerts one such capable slave to prepare to assume sub-master duties. Once the slave confirms that the slave is ready to assume the sub-master duties, the master may transmit a handover frame on the bus, and the slave begins acting as a sub-master. The master may then enter a low-power state, which may promote power savings, reduce heat generation, and provide other advantages. While exemplary aspects are well suited for a SOUNDWIRE communication bus, the present disclosure may be applied to any bus that does not normally allow transfer of master duties.

In this regard, FIG. 1 is a block diagram of an exemplary computing system having a communication bus having a master and multiple slaves. For the purposes of illustration, the communication bus is a SOUNDWIRE bus, although as noted above, exemplary aspects are applicable to other buses that do not allow transfer of master duties. In this regard, the computing system is a SOUNDWIRE system 100, which includes an application processor 102 coupled to a plurality of microphones 104(1)-104(2), a codec 105, a plurality of speakers 106(1)-106(2), and perhaps a modem 107 by a multi-wire bus 108. The multi-wire bus 108 includes a clock line 120 and one or more (up to eight) data lines 122(1)-122(8). The application processor 102 is a master of the SOUNDWIRE system 100, and the plurality of microphones 104(1)-104(2), the codec 105, the plurality of speakers 106(1)-106(2), and the modem 107 are slaves, at least with respect to the multi-wire bus 108. More information on the SOUNDWIRE specification may be found at Specification for SOUNDWIRE, version 1, released Jan. 21, 2015, available at members.mipi.org/wg/LML/document/folder/8154 to MIPI members. The SOUNDWIRE specification is incorporated by reference in its entirety.

The application processor 102 may include an interface 124 configured to be coupled to the multi-wire bus 108. The interface 124 is coupled to a transceiver 126 (Tx/Rx) that is capable of driving the clock line 120 and the data lines 122(1)-122(8) as is well understood. The application processor 102 further includes a control system 128 (CS) and a clock source 130. The control system 128 may interoperate with memory 132 having software stored therein to effectuate aspects of the present disclosure. For example, software drivers for the transceiver 126 and/or the interface 124 may be present in the memory 132. The clock source 130 may receive an input from an external system clock (not shown), have its own crystal oscillator, or otherwise generate a clock signal that is used on the clock line 120.

While shown as being separate integrated circuits (ICs), it is possible that multiple components may be incorporated into a single IC. For example, a robust system on a chip (SoC) may include multiple processing cores, including a codec and a modem, in addition to other processing functions. In such an instance, the multi-wire bus 108 may be completely contained within the single IC or may be partially within the single IC and partially external to the IC. For example, the codec, the modem, and the application processor may be internal with internal links and the speakers and the microphones may be external with the external multi-wire bus 108.

In a conventional system, the SOUNDWIRE specification requires that the master remain active during any period there is activity on the bus. In particular, the master provides the clock to the bus and also is the only device that owns the frame size, the synchronization, the opcode, the parity bit, and the control information. The requirement to be active means that the master cannot, in conventional systems, be put into a low-power or sleep mode if there is any activity on the bus, even if there is no traffic addressed to the master. Such prohibition means that the master will continue to draw power, which in turn, accelerates depletion of a battery for a mobile terminal. In many instances, the master is the application processor, which is amongst the most power-intensive circuits in the mobile terminal. Thus, being able to put the master into a low-power mode may have disproportionate power-saving opportunities.

Exemplary aspects of the present disclosure allow the application processor 102, in its role as master of the SOUNDWIRE system 100, to transfer part of the duties of being master to a slave in the SOUNDWIRE system 100 when the master is not required for a particular activity taking place on the bus. One such use case is during a phone call where the slaves in the SOUNDWIRE system 100 include a modem and a codec. The call does not need the application processor 102 to be involved once the initial setup is performed. Accordingly, exemplary aspects of the present disclosure allow transfer of some master duties to one of the slaves (e.g., the modem or the codec) and allow the application processor 102 to enter a low-power or sleep mode. However, before the application processor 102 can do so, the slave in question needs to be capable of operating in a sub-master role.

Figure 2:
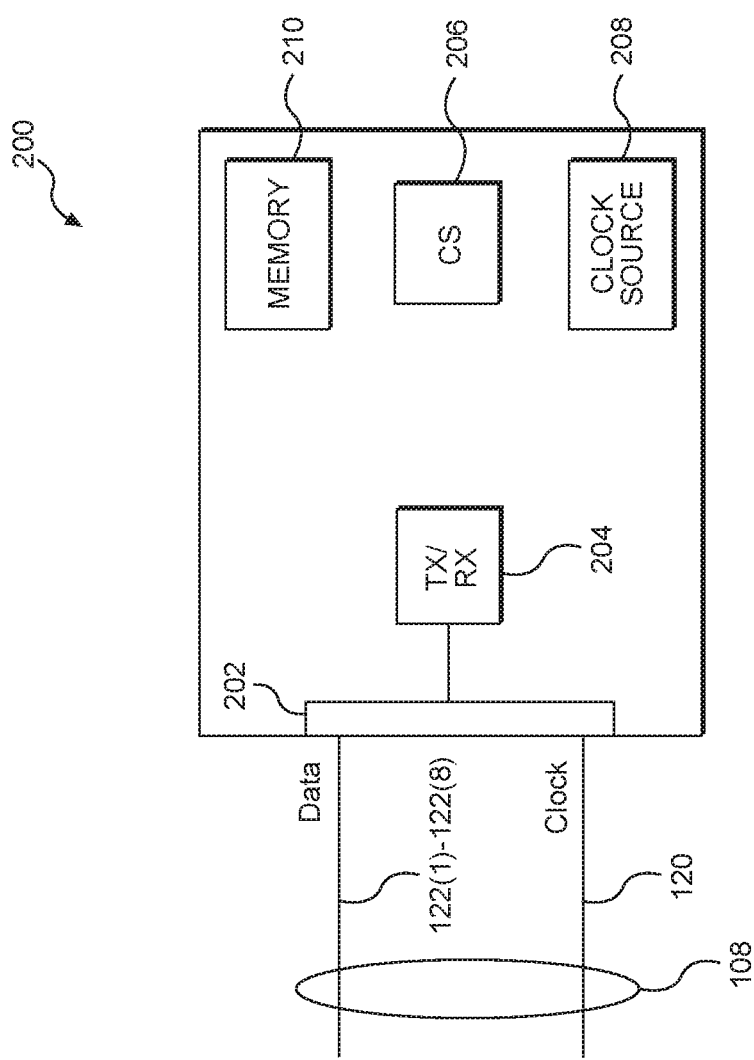
FIG. 2 is a block diagram of a slave capable of assuming sub-master duties.

FIG. 2 illustrates a block diagram of one such slave 200 capable of operating in a sub-master role. In particular, the slave 200 may be, for example, the codec 105, a part of the codec 105, the modem 107, or a part of the modem 107, and may include an interface 202 that is configured to couple to the multi-wire bus 108 containing the clock line 120 and the data lines 122(1)-122(8). The interface 202 is coupled to a transceiver 204 (Tx/Rx) that is capable of driving the clock line 120 and the data lines 122(1)-122(8) as is well understood. The slave 200 further includes a control system 206 (CS) and a clock source 208, which may sometimes be referred to as simply a clock. The control system 206 may interoperate with memory 210 having software stored therein to effectuate aspects of the present disclosure. For example, software drivers for the transceiver 204 and/or the interface 202 may be present in the memory 210. The clock source 208 may receive an input from an external system clock (not shown), have its own crystal oscillator, or otherwise generate a clock signal that is used on the clock line 120 when the slave 200 assumes a sub-master role.

Figure 3:
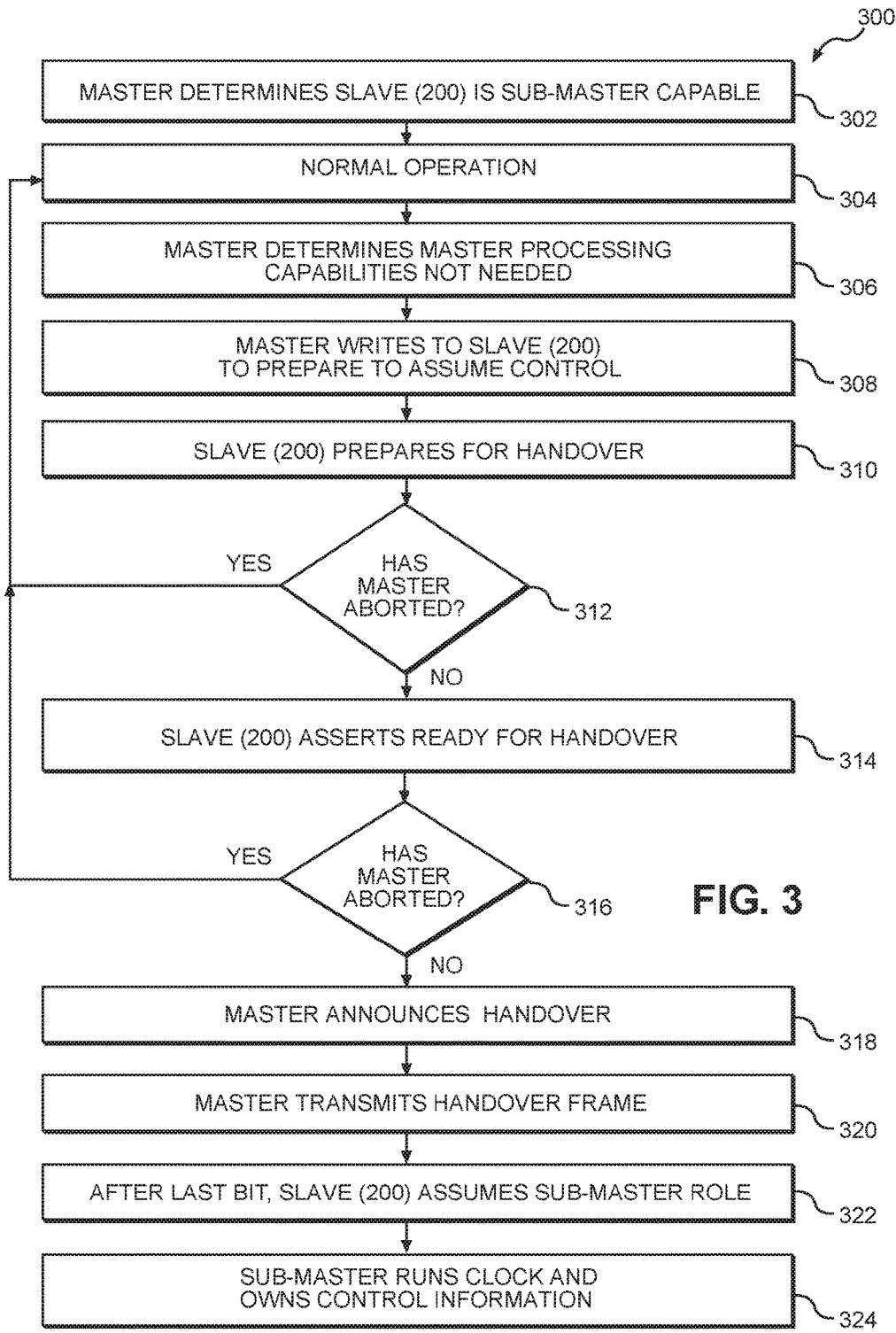
FIG. 3 is a flowchart illustrating an exemplary process for transferring bus master duties to a slave.

A process 300 for allowing transfer of master duties to a slave is illustrated in FIG. 3. In this regard, the process 300 begins with a system having a communication bus having a master and multiple slaves. For example, a SOUNDWIRE system 100 having an application processor 102 acting as a master and at least a slave 200 along with another slave, such as a microphone 104(1), is present. The master determines if the slave 200 is sub-master capable (block 302). In an exemplary aspect, this determination is made by reading from a local discovery register stored in the slave or reading a discoverable file (sometimes referred to as a DISCO file) that is readable by a driver associated with either the master or the slave 200. In another exemplary aspect, a bit in a register is interrogated. In still another exemplary aspect, the presence of a handover register is reported to the master. In still another exemplary aspect, the control system of the master may receive information about the capabilities of the slaves from an external source. For example, if the master is not the application processor, then the master may receive such information from the application processor. Other possible external sources (regardless of whether the master is the application processor) include, but are not limited to a digital signal processor, a SoC, an operating system or the like. Still other techniques of making the determination of block 302 are possible without departing from the scope of the present disclosure. Normal operation proceeds (block 304) until the master determines that the master processing capabilities are not needed for a particular activity (e.g., a phone call where the master does not perform any processing because a modem and codec are capable of fully processing the call) (block 306).

With continued reference to FIG. 3, the master writes to the slave 200 to prepare to assume control (block 308). In an exemplary aspect, the master may write to a handover register (not illustrated) in the slave 200. The slave 200 begins preparing for handover (block 310). In an exemplary aspect, such preparation may include starting the clock source 208, allowing any phase-locked loop (PLL) to settle, clearing buffers and/or registers for ownership of control information, and the like. The master may determine if the master should abort (e.g., the call has already ended, some other audio process requires the master to remain active, or the like) (block 312). If the answer is yes, the master resumes normal operation (block 304) and may erase the values in the handover register or otherwise de-assert the handover initiation process.

With continued reference to FIG. 3, then if the master did not abort at block 312, the slave 200 asserts that the slave 200 is ready for the handover (block 314). This assertion may be through an interrupt, a response to being polled, a response to a control message, a message addressed to the master, or the like. The master determines if the master should abort (block 316). Again, if the master aborts, normal operation resumes as previously described. Otherwise, if the answer to block 316 is no, then the master announces the handover (block 318). This announcement may be through a broadcast write command to registers in each slave (e.g., a master_handover register) or other technique as needed or desired.

With continued reference to FIG. 3, the master may then transmit the handover frame (block 320). The master owns all the bits of the handover frame while the slave 200 waits to take ownership. After the last bit of the handover frame is transmitted, the slave 200 assumes its sub-master role (block 322). The master may then enter a low-power or sleep mode. The new sub-master runs its clock and owns the control information until either the sub-master requests that the master resume master duties or the master is brought out of the low-power or sleep mode.

While the master is in the low-power or sleep mode, the master may keep necessary and sufficient circuitry (e.g., a framer) to listen to the bus 108. The master may act as a slave relative to the sub-master, or the sub-master may not be aware of the master's continued limited presence on the bus 108. The sub-master may conclude the activity for which it was initially granted sub-master responsibility and then may broadcast a message that the sub-master is going to release ownership of the bus 108. Alternatively, the sub-master may go through a handover sequence as outlined above in the process 300, where the original master acts as the master-capable slave. As another alternative, the master may issue an override command which forces a transfer of bus ownership back to the master. This may occur when the master has data or a command for the bus that originated in the master. As still another option, the original master may generate an alert such as by asserting an interrupt that requests bus ownership, and the active sub-master may accept that request and execute a handover when possible (i.e., when there is no audio payload).

Continuing the phone call example introduced above, the sub-master controls the bus 108 during the phone call, but when a hang up occurs terminating the call, there is no further audio payload transported between the two slaves, and the sub-master may enter a process to enter a low-power state including releasing control of the bus 108 or initiating the handover process 300.

Figure 4:
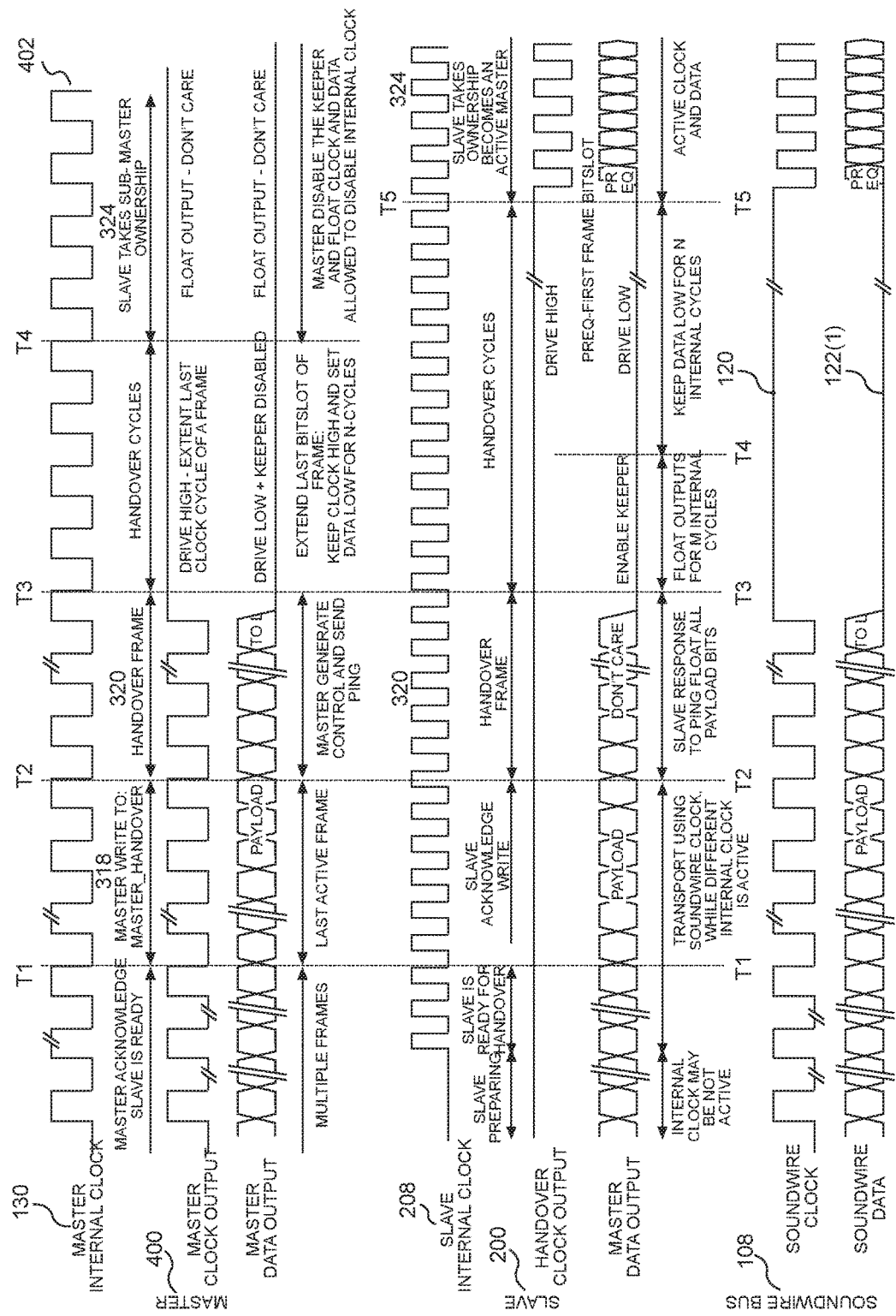
FIG. 4 is a signal diagram showing master signals and slave signals relative to what happens on a bus during a handover sequence.

FIG. 4 provides a signal diagram of an exemplary implementation of the process 300. In particular, FIG. 4 illustrates a master 400 (which may be the application processor 102 of FIG. 1) with its clock source 130 providing a regular clock signal 402. While the clock source 130 provides the regular clock signal 402, the interface of the master 400 may not output the clock signal onto the clock line 120. Specifically, at time T3, at the end of the handover frame, the master clock drives the clock line 120 high and then releases the bus (i.e., a floating output), which allows another clock driver to drive the clock line 120. Thus, as seen on the clock line 120, the clock line 120 stays high between times T3 and T5, when the sub-master clock begins driving the clock line 120. Likewise, the master 400 may generate and output data on the data line 122(1) until time T3 (i.e., the end of the handover frame), at which time the master 400 may drive the data line low and float the output. This allows the sub-master (i.e., the slave 200) to begin driving data on the data line 122(1) at time T5.

With continued reference to FIG. 4, the slave 200, and particularly, the clock source 208 of the slave 200, begins preparing while the master 400 waits to receive the slave ready assertion. Note that initially, the slave clock 208 may not be active. Once the slave 200 is ready for the handover (i.e., block 314), the master 400 announces the handover (i.e., block 318) from time T1 to time T2. The slave 200 may acknowledge the handover announcement between time T1 and T2. At time T2, the handover frame commences. After time T3, the slave 200 begins to drive high the clock line 120 and drive low the data line 122(1) until ready to send clock and data signals at time T5.

The systems and methods for transfer of master duties to a slave on a communication bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
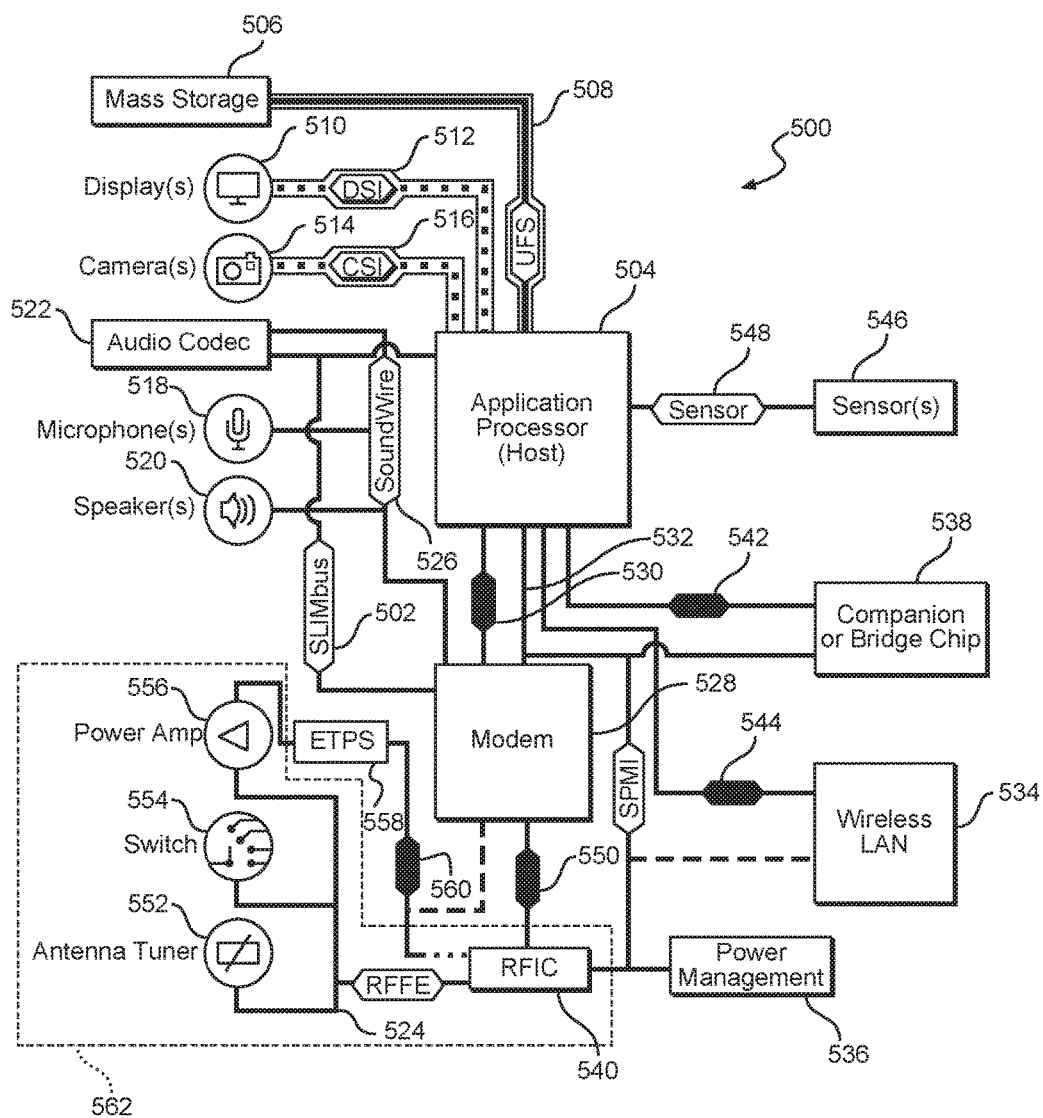
FIG. 5 is a block diagram of an exemplary processor-based system that can include the SOUNDWIRE communication bus of FIG. 1.

In this regard, FIG. 5 is a system-level block diagram of an exemplary mobile terminal 500 such as a smart phone, mobile computing device tablet, or the like. While a mobile terminal is particularly contemplated as being capable of benefiting from exemplary aspects of the present disclosure, it should be appreciated that the present disclosure is not so limited and may be useful in any system having a SOUND-WIRE bus or other bus that normally does not allow master function transfer.

With continued reference to FIG. 5, the mobile terminal 500 includes a SLIMbus 502, which may be coupled to an application processor 504 (sometimes referred to as a host) that communicates with a mass storage element 506 through a universal flash storage (UFS) bus 508. The application processor 504 may further be connected to a display 510 through a display serial interface (DSI) bus 512 and a camera 514 through a camera serial interface (CSI) bus 516. Various audio elements such as a microphone 518, a speaker 520, and an audio codec 522 may be coupled to the application processor 504 through the SLIMbus 502. Additionally, the audio elements may communicate with each other through a SOUNDWIRE™ bus 526. A modem 528 may also be coupled to the SLIMbus 502 and/or the SOUNDWIRE bus 526. The modem 528 may further be connected to the application processor 504 through a peripheral component interconnect (PCI) or PCI express (PCIe) bus 530 and/or a system power management interface (SPMI) bus 532.

With continued reference to FIG. 5, the SPMI bus 532 may also be coupled to a local area network (WLAN) IC (WLAN IC) 534, a power management integrated circuit (PMIC) 536, a companion IC (sometimes referred to as a bridge chip) 538, and a radio frequency IC (RFIC) 540. It should be appreciated that separate PCI buses 542 and 544 may also couple the application processor 504 to the companion IC 538 and the WLAN IC 534. The application processor 504 may further be connected to sensors 546 through a sensor bus 548. The modem 528 and the RFIC 540 may communicate using a bus 550.

With continued reference to FIG. 5, the RFIC 540 may couple to one or more RFFE elements, such as an antenna tuner 552, a switch 554, and a power amplifier 556 through a radio frequency front end (RFFE) bus 524. Additionally, the RFIC 540 may couple to an envelope tracking power supply (ETPS) 558 through a bus 560, and the ETPS 558 may communicate with the power amplifier 556. Collectively, the RFFE elements, including the RFIC 540, may be considered an RFFE system 562. It should be appreciated that the RFFE bus 524 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A master integrated circuit (IC) on a SOUNDWIRE bus comprising:
   a bus interface configured to be coupled to the SOUNDWIRE bus;
   a transceiver coupled to the bus interface; and
   a control system operatively coupled to the transceiver and configured to:
      instruct a slave device amongst a plurality of slave devices coupled to the SOUNDWIRE bus to prepare to assume sub-master control of the SOUNDWIRE bus; and
      pass master duties to the slave device by sending a handover command across the SOUNDWIRE bus and sending a handover frame to mark passed control.

2. The master IC of claim 1, wherein the control system is further configured to determine that the slave device is capable of assuming a sub-master role.

3. The master IC of claim 2, wherein the control system configured to determine that the slave device is capable of assuming the sub-master role comprises the control system configured to read capabilities from the slave device.

4. The master IC of claim 3, wherein the control system configured to read the capabilities from the slave device comprises the control system configured to read the capabilities from either a register or a discoverable (DISCO) file.

5. The master IC of claim 2, wherein the control system configured to determine that the slave device is capable of assuming the sub-master role comprises the control system configured to receive information from an external source.

6. The master IC of claim 5, wherein the control system configured to receive the information from the external source comprises the control system configured to receive the information from an application processor, a digital signal processor, or an operating system.

7. The master IC of claim 1, wherein the control system is further configured to abort handover of the master duties before passing the master duties to the slave device.

8. The master IC of claim 1, wherein the control system is further configured to receive information from the slave device indicating readiness to assume the sub-master control of the SOUNDWIRE bus.

9. The master IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A slave integrated circuit (IC) comprising:
   a bus interface configured to be coupled to a SOUNDWIRE bus;
   a transceiver coupled to the bus interface; and
   a control system operatively coupled to the transceiver and configured to:
      receive an instruction from a master IC through the SOUNDWIRE bus to prepare to assume sub-master control of the SOUNDWIRE bus; and
      assume the sub-master control of the SOUNDWIRE bus by acknowledging a handover command from the master IC.

11. The slave IC of claim 10, further comprising a clock source and wherein the control system is further configured to use the clock source to provide a clock signal to the SOUNDWIRE bus when the control system assumes the sub-master control of the SOUNDWIRE bus.

12. The slave IC of claim 10, wherein the control system is further configured to own control information of the SOUNDWIRE bus when the control system assumes the sub-master control of the SOUNDWIRE bus.

13. The slave IC of claim 10, wherein the control system is further configured to provide an indication that the slave IC is prepared to assume the sub-master control of the SOUNDWIRE bus.

14. The slave IC of claim 10, wherein the control system is further configured to release master duties back to the master IC.

15. A method comprising:
   commencing operation with a plurality of devices coupled to a communication bus, wherein a first device of the plurality of devices operates as a master device and other devices of the plurality of devices operate as slave devices;
   instructing, through the communication bus, one of the slave devices to prepare to assume sub-master control of the communication bus; and
   passing master duties from the master device to the one of the slave devices by transmitting a handover command across the SOUNDWIRE bus and transmitting a handover frame to mark passed control.

16. The method of claim 15, further comprising determining that the one of the slave devices is capable of operating as a sub-master of the communication bus.

17. The method of claim 16, wherein determining that the one of the slave devices is capable of operating as the sub-master of the communication bus comprises reading a discoverable (DISCO) file associated with the one of the slave devices.

18. The method of claim 15, wherein the communication bus is a SOUNDWIRE communication bus.

19. The method of claim 15, further comprising placing the master device into a sleep or low-power mode after passing the master duties.

20. The method of claim 15, further comprising resuming the master duties by the master device.

21. The method of claim 15, wherein passing the master duties comprises having the one of the slave devices provide a clock signal to the communication bus.

22. The method of claim 15, wherein passing the master duties comprises having the one of the slave devices own control information passed on the communication bus.

23. A SOUNDWIRE system comprising:
   a SOUNDWIRE bus;
   a master integrated circuit (IC) comprising:
      a master bus interface configured to be coupled to the SOUNDWIRE bus;
      a master transceiver coupled to the master bus interface; and
      a master control system operatively coupled to the master transceiver; and a slave IC comprising:
- a slave bus interface configured to be coupled to the SOUNDWIRE bus;
- a slave transceiver coupled to the slave bus interface; and
- a slave control system operatively coupled to the slave transceiver;

wherein the master control system is configured to:
- instruct the slave control system to prepare to assume sub-master control of the SOUNDWIRE bus; and
- pass master duties to the slave IC by sending a handover command across the SOUNDWIRE bus and sending a handover frame to mark passed control.

24. The SOUNDWIRE system of claim 23, wherein the master IC and the slave IC are within a single system on a chip (SoC).

25. The SOUNDWIRE system of claim 23, wherein the slave control system is configured to alert the master IC that the slave IC is ready to assume the sub-master control of the SOUNDWIRE bus.

26. The SOUNDWIRE system of claim 23, wherein the slave IC comprises a clock source and, on assumption of the sub-master control of the SOUNDWIRE bus, the slave IC provides a clock signal to the SOUNDWIRE bus.

* * * * *